United States Patent
Sasanuma

(10) Patent No.: US 7,274,490 B2
(45) Date of Patent: Sep. 25, 2007

(54) IMAGE FORMING APPARATUS WITH CONTROL OF MAXIMUM OUTPUT OF COLORANT

(75) Inventor: Nobuatsu Sasanuma, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1047 days.

(21) Appl. No.: 10/361,776

(22) Filed: Feb. 11, 2003

(65) Prior Publication Data

US 2003/0156120 A1 Aug. 21, 2003

(30) Foreign Application Priority Data

Feb. 19, 2002 (JP) .............................. 2002-042039

(51) Int. Cl.
*G06F 15/00* (2006.01)
*G06F 3/08* (2006.01)
*G06K 6/00* (2006.01)

(52) U.S. Cl. ..................... 358/1.9; 358/523; 382/167

(58) Field of Classification Search ................ 358/1.9, 358/518, 520, 523, 530, 525, 504, 521, 519, 358/515, 534; 382/167, 162
See application file for complete search history.

(56) References Cited

U.S. PATENT DOCUMENTS

| | | | |
|---|---|---|---|
| 5,028,991 A * | 7/1991 | Sekizawa et al. ........... 358/537 |
| 5,258,783 A | 11/1993 | Sasanuma et al. ........... 346/157 |
| 5,414,531 A | 5/1995 | Amemiya et al. ........... 358/465 |
| 5,566,372 A | 10/1996 | Ikeda et al. ................. 355/208 |
| 5,572,330 A | 11/1996 | Sasanuma ................... 358/298 |
| 5,856,876 A | 1/1999 | Sasanuma et al. .......... 358/300 |
| 6,034,788 A | 3/2000 | Sasanuma et al. .......... 358/406 |
| 6,128,407 A * | 10/2000 | Inoue et al. ................. 382/167 |
| 6,151,410 A * | 11/2000 | Kuwata et al. ............. 382/167 |
| 6,172,771 B1 | 1/2001 | Ikeda et al. ................. 358/406 |
| 6,184,915 B1 | 2/2001 | Atsumi et al. .............. 347/251 |
| 6,198,844 B1 * | 3/2001 | Nomura ...................... 382/168 |
| 6,201,616 B1 | 3/2001 | Sasanumi et al. ........... 358/450 |
| 6,515,769 B1 | 2/2003 | Ikeda et al. ................. 358/3.1 |
| 6,650,772 B1 * | 11/2003 | Inoue et al. ................. 382/162 |
| 6,995,865 B1 * | 2/2006 | Motomura ................... 358/1.9 |
| 7,016,549 B1 * | 3/2006 | Utagawa ...................... 382/261 |
| 2001/0033260 A1* | 10/2001 | Nishitani et al. ............. 345/87 |

FOREIGN PATENT DOCUMENTS

JP 2001094788 A * 4/2001

* cited by examiner

*Primary Examiner*—Madeleine A V Nguyen
(74) *Attorney, Agent, or Firm*—Fitzpatrick, Cella, Harper & Scinto

(57) ABSTRACT

In an image forming apparatus which forms a color image by superposing cyan, magenta, yellow and black toners on a recording medium, a circuit to limit image signals is provided immediately before a gamma correction circuit which corrects an output characteristic inherent in the apparatus so that the sum total of the signal levels of the image signals of the respective colors does not exceeds a predetermined value. Thus, even if a user arbitrarily sets color profile data for color management, a toner spread amount can be controlled not to exceed the predetermined value.

8 Claims, 5 Drawing Sheets

IMAGE FORMING APPARATUS WITH CONTROL OF MAXIMUM OUTPUT OF COLORANT

BACKGROUND OF THE INVENTION

1. Field of the Invention

The present invention relates to an image forming method which forms a full-color image by using multicolored coloring materials.

2. Related Background Art

In a conventional full-color image forming apparatus, it is impossible exhaustlessly to spread coloring materials on a medium such as paper or the like. That is, if it is intended to superpose coloring materials of which the total amount exceeds a certain saturation point, there can occur a situation that may damage the image forming apparatus itself.

For example, in a case where the full-color image forming apparatus uses a electrophotographic method, if more toner than an allowable amount is spread on the same area of a photosensitive drum, the spread toner comes to be poorly transferred to recording medium, and treatment of the residual toner on the drum after such a toner transfer operation has ended comes to be a problem. For example, in this case, the unexpected residual toner is unfortunately spread to cleaning parts of the apparatus. Therefore, in the worst case, there is a possibility that the cleaning parts may be damaged.

Moreover, in a so-called cleaning-less system, which has been designed in an environment-friendly manner so that waste toner is not exhausted outside the image forming apparatus more than cannot be avoided, if more toner than an expected amount is spread on a photosensitive drum, residual toner remains on the drum after the toner transfer operation has ended. This residual toner blurs the electrification system, and thus affects the electrification capacity of the system. In addition, there is a high possibility that the residual toner will cause undesirable color mixture in an other-color image forming station, producing the undesirable situation that the apparatus cannot output an image having the exact colors that it should.

Moreover, for example, even if a large amount of toner can be spread on a given area on a recording medium, in the thermocompression fixing method using a fixing roller, which is frequently adopted in image forming apparatus that use the electrophotographic method, the image forming apparatus may be unable to provide the necessary amount of heat because the amount of spread toner is so large, whereby poor fixing occurs. On the other hand, even if the toner can be fixed or adhered to the medium, the resulting large amount of fused toner may be impossible to fix to the medium completely, and offset due to the fused toner occurs on the fixing roller. Moreover, it becomes difficult for the toner to separate from the fixing roller, whereby the medium may accidentally be wound around the fixing roller.

Such situations as those described above are ones with which a user cannot cope alone, and which therefore require the user to bring the broken machine to a service center or call a serviceman to repair the broken machine.

Moreover, even in an ink-jet printer, if excessive ink is discharged or emitted onto a medium, a problem of bleeding (a phenomenon that the ink flows out on the medium before it gets dry) occurs. In addition, there may occur an unusual situation in which the ink penetrates through the medium and reaches the back side thereof.

Thus, in this case, when the generation amount of black ink is determined, conventionally a UCR (under-color removal) process is performed to reduce the maximum signal sum total for cyan, magenta, yellow and black inks. Here, it should be noted that, if the maximum value of one color ink is assumed to be 100%, the maximum signal sum total is frequently defined by numeric values of 270%, 300% and the like.

Moreover, a color balance is changed so that the amount of spread toner does not become excessive.

FIG. 2 is a diagram showing an image data processing flow of the conventional full-color image forming apparatus. Incidentally, there are various types of image data which are dependent on intended purposes and use applications; that is, there are RGB-system image data, which are representative of sRGB-system image data based on the three primary colors of a CRT monitor, and CMY-system mage data, which are mainstream in the printing world. (Here, it should be noted that symbols R, G, B, C, M, Y and K respectively denote red, green, blue, cyan, magenta, yellow and black.)

Whichever system of image data is used, the image data to be handled are finally converted into color signals which are optimum for the coloring materials (C, M, Y and K coloring materials in most cases) to be used in a given image output apparatus, and a color matching process is performed based on the obtained color signals, whereby an output material of beautiful and satisfactory colors can be obtained.

Such a color conversion is performed by CMM's (color management modules) 121 and 122. In order to secure color accuracy of the image output apparatus with a higher precision, the CMM's 121 and 122 have conversion characteristics as profiles 128 and 129 respectively, so that a user can customize the CMM in accordance with a characteristic of the image output apparatus by appropriately changing the conversion characteristic.

As a means for achieving high-precision color matching, there is an ICC profile which has been proposed by the ICC (International Color Consortium). Recently, such a technique has begun to be generally used for a proof of color printing (in the proof, an output material substantially equivalent to the material to be finally printed is output and checked before the final printing is performed), and has been available as Color Profile Maker™ and Color Profile Builder™ in the form of software for a tool to perform the color matching accurately.

The C, M, Y and K signals which have been subjected to the color matching are then input to a digital spatial filter circuit 123. In the digital spatial filter circuit 123, the sharpness of the input signals is appropriately adjusted. After that, the C, M, Y and K signals are input to a gradation adjustment circuit 124. In the gradation adjustment circuit 124, the gradation of the colors represented by the input signals can be appropriately adjusted according to the user's inclination. Then, the processed signals are further input to a gamma LUT (look-up table) circuit 125. In the gamma LUT circuit 125, a gradation nonlinear characteristic of the image output apparatus is corrected on the basis of the input signals.

After that, the C, M, Y and K signals are input to a digital halftoning processing circuit 126. In the digital halftoning processing circuit 126, for example, the input signals are processed to increase multidither screen dots in a gradation reproduction method optimum for the image forming apparatus, or to increase the number of dots per unit area according as the gradation becomes denser, as in an error diffusion method. Finally, the processed signals are input to a writing element driver circuit 127, whereby an image is formed on the basis of the input signals.

Here, it should be noted that the gradation adjustment circuit 124 is provided to perform the input/output conversion of the C, M, Y and K signals and adjust a color balance of these signals.

That is, in order to form a full-color image, each of the C, M, Y and K signals output from the digital spatial filter circuit 123 is plane-sequentially processed with the corresponding color ink through the gradation adjustment circuit 124, the gamma LUT circuit 125 and the digital halftoning processing circuit 126, and then the images of the four colors are multiplexed together.

However, even if the amount of spread toner is controlled in the UCR process and the color balance adjustment described as above, since the respective profiles 128 and 129 of the CMM's 121 and 122 can be set directly by the user, it is not likely to be possible control the amount of spread toner just using the contents of the profile data of the CMM directly set by the user.

That is, in a case of adjusting the color balance in the gradation adjustment circuit 124, when the color balance has been set so that the density becomes higher, if it is adjusted by the CMM to set the plural colors of C, M, Y and K to become simultaneously higher, the amount of spread toner might exceed the expected amount.

SUMMARY OF THE INVENTION

An object of the present invention is to provide an image forming method and apparatus that can eliminate the above conventional inconvenience.

Another object of the present invention is to provide an image forming method and apparatus that provide a processing circuit to limit the sum total of input color image signals so that the sum total does not exceeds an arbitrary level, and thus significantly reduce the probability that an excessively spread coloring material will damage the image forming apparatus itself.

Still another object of the present invention is to provide an image forming method and apparatus that limit an amount of spread coloring materials immediately before data conversion is performed by using an LUT for correcting a signal conversion characteristic inherent in the image forming apparatus.

Other features of the present invention will be apparent from the following description taken in conjunction with the accompanying drawings and the appended claims.

DETAILED DESCRIPTION OF THE PREFERRED EMBODIMENTS

Hereinafter, the embodiments of the present invention will be explained with reference to the attached drawings.

First Embodiment

Figure 1:
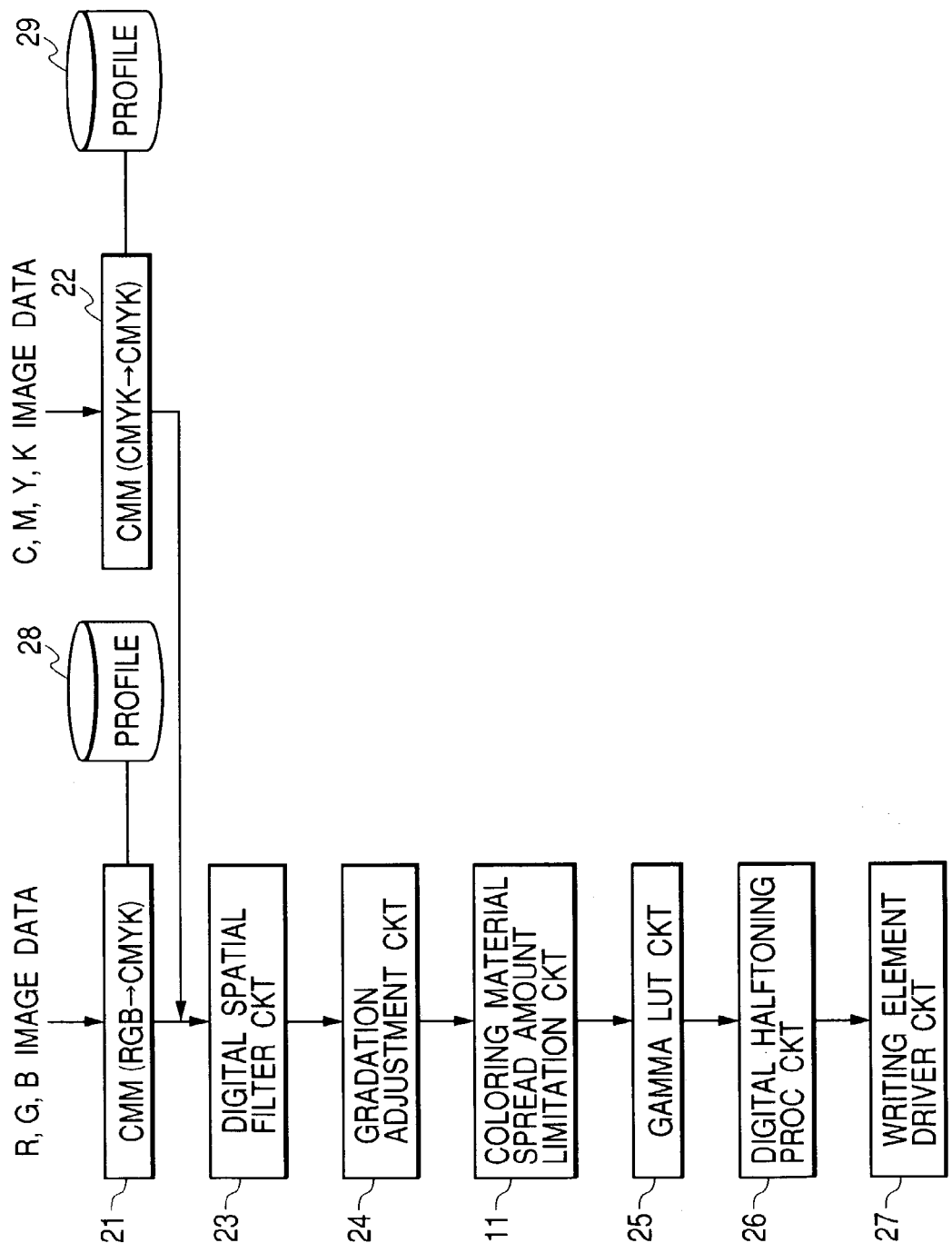
FIG. 1 is an image processing structural diagram for explaining an image forming apparatus according to the first embodiment of the present invention.
Figure 2:
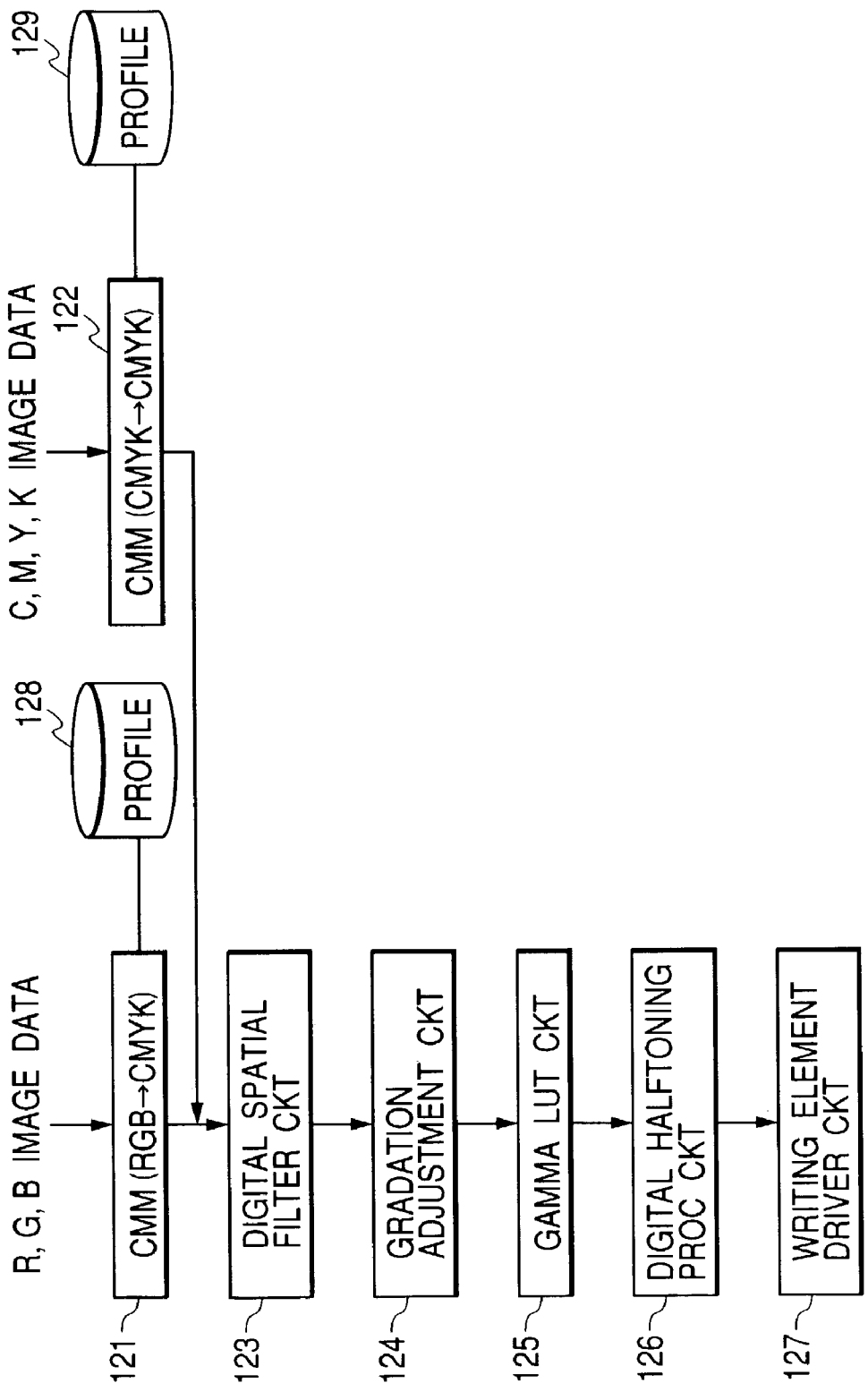
FIG. 2 is a diagram showing an image data processing flow of a conventional full-color image forming apparatus.

FIG. 1 is an image processing structural diagram for explaining an image forming apparatus according to the first embodiment of the present invention. The image forming apparatus shown in FIG. 1 is different from the conventional image forming apparatus shown in FIG. 2 in the point that a coloring material spread amount limitation circuit 11 is provided between a gradation adjustment circuit 24 and a gamma LUT circuit 25. Therefore, it should be noted that the structure of the image forming apparatus in the present embodiment is the same as the structure of the conventional image forming apparatus except for the coloring material spread amount limitation circuit 11. That is, color conversion is performed by CMM's 21 and 22. Moreover, in order to secure color accuracy of the image forming apparatus with a higher precision, the CMM's 21 and 22 have conversion characteristics as profiles 28 and 29 respectively, whereby a user can customize the CMM in accordance with a characteristic of an image output apparatus by appropriately changing the conversion characteristic.

Thus, C, M, Y and K signals which have been subjected to color matching are input to a digital spatial filter circuit 23. In the digital spatial filter circuit 23, the sharpness of the input signals are appropriately adjusted. After then, the C, M, Y and K signals are input to the gradation adjustment circuit 24, and further input to the gamma LUT circuit 25. In the gamma LUT circuit 25, a gradation nonlinear characteristic of the image output apparatus is corrected on the basis of the input signals.

After then, the C, M, Y and K signals are input to a digital halftoning processing circuit 26. In the digital halftoning processing circuit 125, such a gradation reproduction process as described above is performed. Finally, the processed signals are input to a writing element driver circuit 27, whereby an image is formed on the basis of the input signals.

More specifically, input R, G and B image data are converted into the device-dependent C, M, Y and K signals by the CMM 21 in accordance with color conversion information registered in the profile 28.

On the other hand, input C, M, Y and K image data are converted into the device-dependent C, M, Y and K signals by the CMM 22 in accordance with color conversion information registered in the profile 29. Then, the C, M, Y and K signals converted and generated by the C, M, Y or K are processed by the digital spatial filter circuit 23 to optimize the spatial frequency characteristics thereof. More specifically, the digital process in the digital spatial filter circuit 23 is to perform a matrix operation on the basis of information of a target pixel and its peripheral pixels.

Next, the gradation adjustment process is performed by the gradation adjustment circuit 24. More specifically, the gradation adjustment circuit 24 performs the gradation adjustment process, a color balance adjustment process, a masking process and the like in a method such as a method of determining an output signal by operating an input signal, a method of converting an input signal by using an LUT, and the like. Moreover, the coloring material spread amount limitation circuit 11 is provided between the gradation adjustment circuit 24 and the gamma LUT circuit 25.

The operation of the coloring material spread amount limitation circuit 11 will now be explained.

Figure 3:
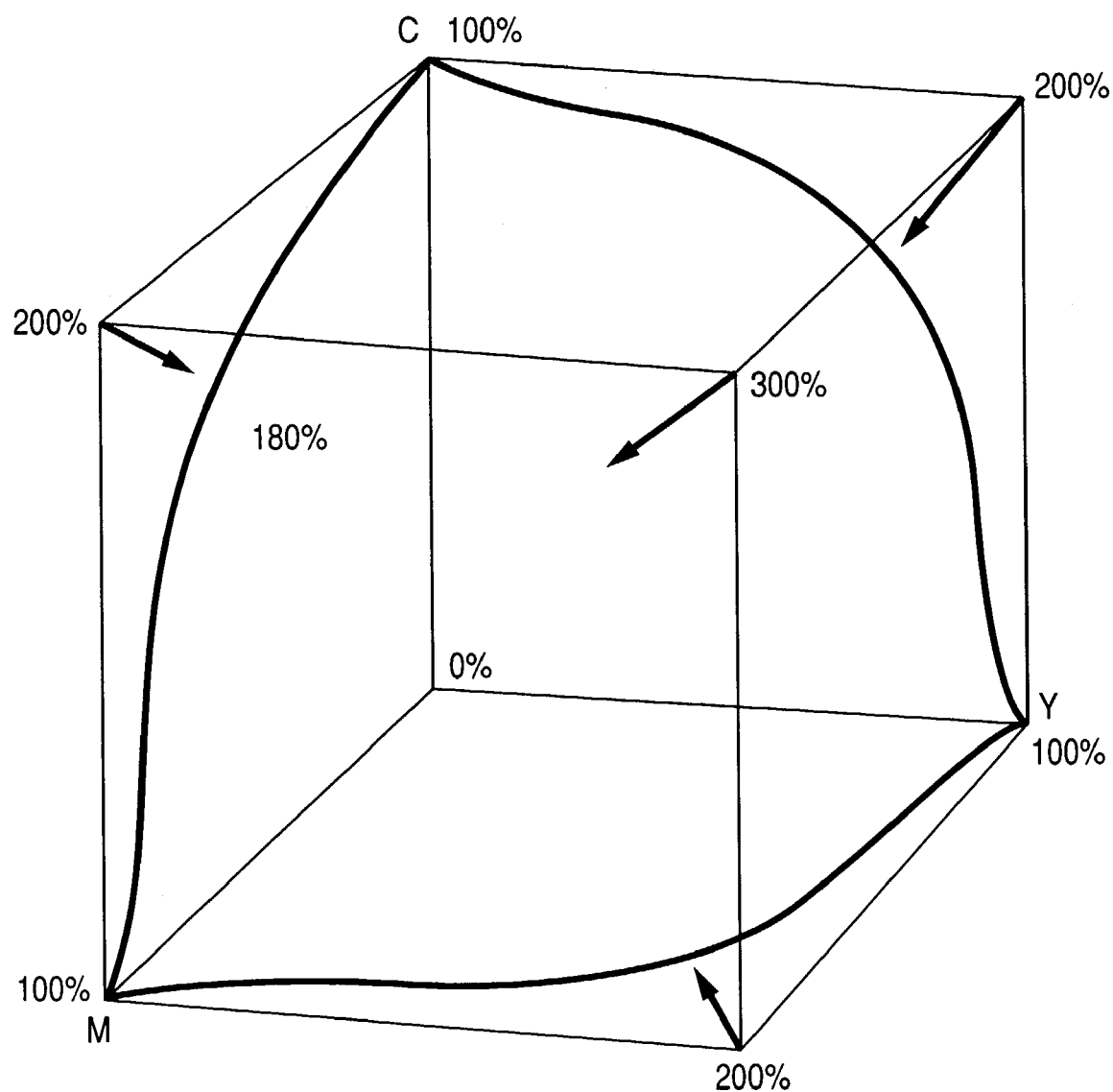
FIG. 3 is a diagram for explaining a concept of signal conversion in a coloring material spread amount limitation circuit.

FIG. 3 is a diagram for explaining a concept of signal conversion in the coloring material spread amount limitation circuit 11 which is operated on the basis of a multidimensional LUT. Here, it should be noted that, since a four-dimensional phenomenon cannot be well shown in an explanation diagram, the operation of the multidimensional LUT will be explained on the basis of a case example in which only three colors, C, M and Y, are used.

In FIG. 3, the three axes respectively indicate the signal scales of C, M and Y, and the point of 0% indicates the point where no coloring material is spread. Here, it should be noted that the scale of each axis is determined so that the maximum amount of spread coloring material of each color becomes 100%.

If it is assumed that, in a case where the image forming apparatus reproduces various colors as appropriately blending the coloring materials, an abnormal phenomenon happens when the coloring materials are spread 180% or more, it is necessary to limit the signals within the curve indicated by the arrows. In practice, the limitation is performed by combining also black.

How to set the multidimensional LUT will now be explained.

Incidentally, it is best for the multidimensional LUT to have all the combinations of the signals on the input side. However, since memory capacity is limited, rough lattice points are registered beforehand. Then, if a signal between the adjacent lattice points is input, an interpolation operation is performed based on the input signal.

Figures 4A, 4B:
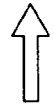
FIGS. 4A and 4B are diagrams showing an example of a multidimensional LUT.

FIGS. 4A and 4B are diagrams showing an example of the multidimensional LUT.

More specifically, FIG. 4A shows input C, M, Y and K data strings, and FIG. 4B shows output data strings. Here, a case example of 180% limitation is shown in FIGS. 4A and 4B.

The input signal (0, 0, 0, 0) (the order of values in parentheses is C, M, Y and K) shown at the uppermost row of FIG. 4A is given as the signal (0, 0, 0, 0) shown at the uppermost row of FIG. 4B, and similarly the input signal (0, 0, 220, 220) is given as the signal (0, 0, 220, 220). Likewise, the input signal of which the coordinates point is between the above successive input signals is linearly interpolated to generate the output signal. For example, the input signal (0, 0, 110, 110) is converted into the output signal (0, 0, 110, 110). That is, since the relation between the input signal and the output signal is maintained in this case, also the interpolated value of the input signal between the previously registered successive lattice points is maintained as it is.

Furthermore, the input signal (0, 0, 255, 255) is converted into the output signal (0, 0, 230, 230), and the signal (0, 0, 240, 240) is linearly compressed by the interpolation into the signal (0, 0, 226, 226).

In the example shown in FIGS. 4A and 4B, the signal levels of yellow and black are set to be the same with each other. However, in a case where the signal level of each color is different from others (the signal level is 221 or more), the linear interpolation for each color is performed between the signal levels 220 to 230.

Moreover, in a case where the signal levels of three colors are not 0, the input signal (0, 130, 130, 130) is given as the output signal (0, 130, 130, 130) without change on the table. However, the input signal (0, 255, 255, 255) is converted into the output signal (0, 153, 153, 153), and the input signals between the input signals (0, 130, 130, 130) and (0, 255, 255, 255) are linearly interpolated.

Moreover, in a case where the signal level of each color is different from others (the signal level is 130 or more), the linear interpolation for each color is performed between the signal levels 130 to 153.

Moreover, in a case where the signal levels of all four colors are not 0, the input signal (100, 100, 100, 100) is given as the output signal (100, 100, 100, 100) without change on the table. However, the input signal (255, 255, 255, 255) is converted into the output signal (115, 115, 115, 115), and the input signals between the input signals (100, 100, 100, 100) and (255, 255, 255, 255) are linearly interpolated. Moreover, in a case where the signal level of each color is different from others (the signal level is 100 or more), the linear interpolation for each color is performed between the signal levels 100 to 115.

To explain simply, FIGS. 4A and 4B merely show the representative points. However, it is needless to say that it is better in practice to set the parameters of the four-dimensional LUT in more detail so that the points to be linearly converted do not become discontinuous. Moreover, it is possible to change a limitation ratio according to the color if necessary.

The signal of which the signal level has been limited is corrected by the gamma LUT 25 which corrects the nonlinear gradation component inherent in the printer, the corrected signal is then subjected to the gradation process by the digital halftoning processing circuit 26 according to the gradation reproduction method suitable for the image forming apparatus, and the processed signal is finally supplied to the writing element driver circuit 27.

As above, according to the present embodiment, the process by the coloring material spread amount limitation circuit 11 is performed immediately before the process by the gamma LUT 25 which corrects the nonlinear gradation component inherent in the image forming apparatus is performed. Thus, even if any profile is used in the CMM, it is possible to precisely limit the amount of spread coloring material, whereby it is possible to significantly reduce the probability that the excessively spread coloring material damages the image forming apparatus itself.

Second Embodiment

It is well known that a limitation amount of coloring material is different according to a kind of medium on which an image is to be recorded by the coloring material. That is, when an image forming process in which an electrophotographic system using toner as a coloring material is adopted is performed, if a medium such as a thick paper is used, thermal energy is absorbed by the medium itself, whereby a coloring material fixing condition cannot be satisfied. Therefore, if it intends to fix (or adhere) the coloring material to the medium at the fixing speed same as that in case of fixing the coloring material to an ordinary-thickness medium, it is necessary to reduce an amount of toner. Alternatively, it is necessary to lower the fixing speed so as to assure sufficient thermal energy.

On one hand, even when an image forming process in which an ink-jet system for discharging ink to a recording medium is adopted is performed, since an ink acceptance amount of the media of which the ink absorption speed is high is different from that of the media of which the ink absorption speed is low, it is necessary to limit a signal level according to a kind of medium.

Figure 5:
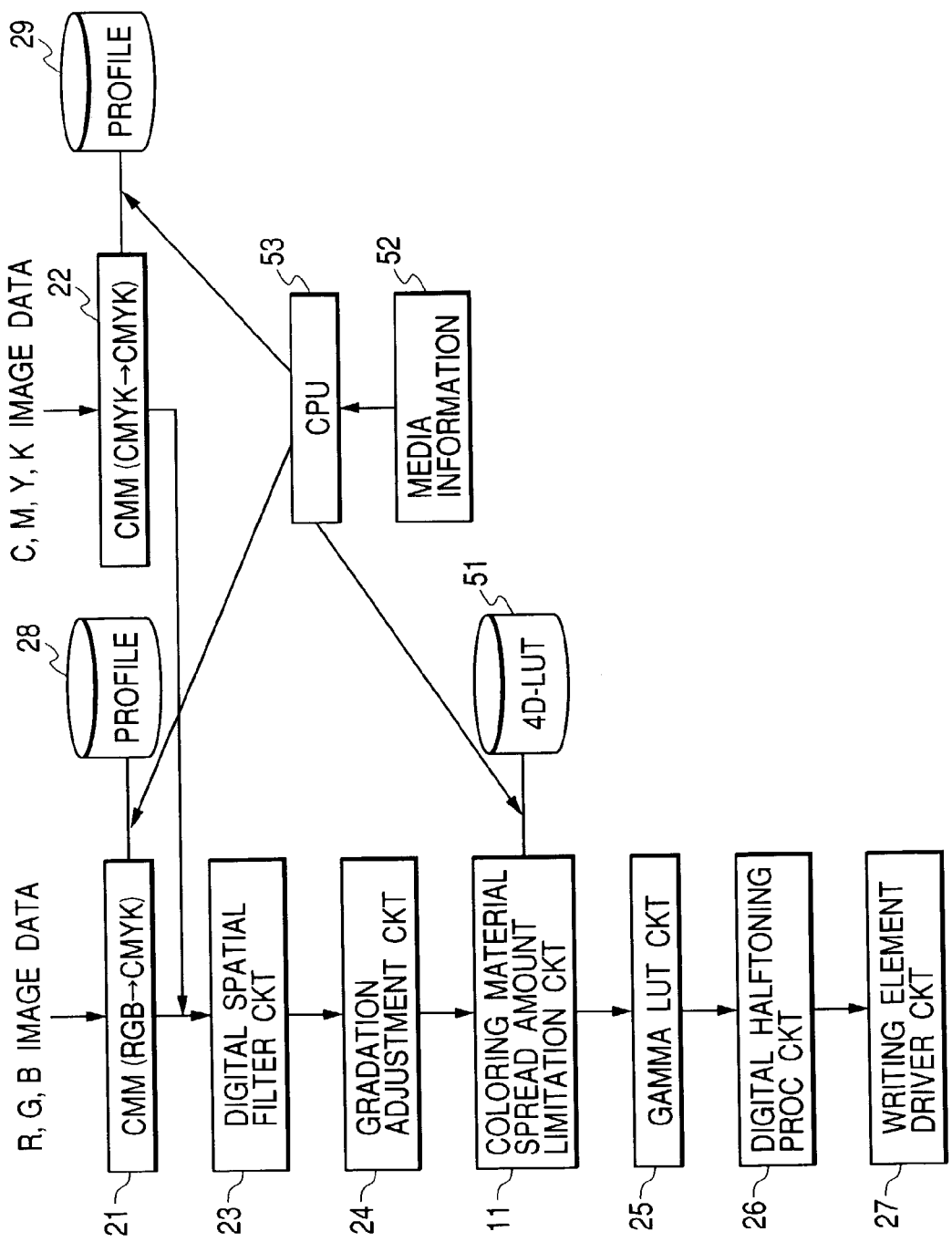
FIG. 5 is an image processing structural diagram for explaining an image forming apparatus according to the second embodiment of the present invention.

FIG. 5 is an image processing structural diagram for explaining an image forming apparatus according to the second embodiment of the present invention. In the present embodiment, if a user of the image forming apparatus selects a medium of which the material is suitable for an image to be formed on the selected medium, a CPU 53 which received media information 52 corresponding to the selected medium selects and sets profiles 28 and 29 which are optimum for the selected medium. Moreover, the CPU 53 selects a 4D-LUT (four-dimensional LUT) 51 corresponding to the selected medium, and sets a coloring material spread amount limitation circuit 11.

Here, it should be noted that, since other circuit components shown in FIG. 5 are substantially the same as those of the same reference numerals shown in FIG. 1 of the first embodiment, the explanation thereof will be omitted.

As above, according to the present embodiment, each parameter is set according to the kind of medium. Thus, even if various kinds of media are used, it is possible to prevent that the image forming apparatus is damaged due to excessively spread ink, whereby it is possible to achieve the optimum image forming process.

Third Embodiment

There is a case where a user intends to suppress a coloring material consumption amount even if an image quality level is disregarded. For example, if the amount of remaining coloring material is decreasing while printing is being performed, the user might wish to give priority to completion of image output even if color reproduction degrades.

In such a case, in addition to a mode to use an ordinary amount of coloring material, a mode to use a less amount of coloring material is prepared beforehand in an image forming apparatus. Thus, if the user selects the mode to use the less amount of coloring material, a parameter which is to be ordinarily used in a coloring material spread amount limitation circuit is replaced by an extremely low parameter such as a spread amount 120% or the like, whereby it is possible to provide a so-called consumption saving mode.

What is claimed is:

1. An image forming method in an image forming apparatus which forms a color image by adhering plural coloring materials to a recording medium, said method comprising:
    an input step of inputting an image signal;
    a color conversion step of performing a color conversion process on the image signal input in said input step, on the basis of profile data, and outputting plural color component signals;
    a gradation conversion step of performing a gradation conversion process on the plural color component signals output in said color conversion step;
    a correction step of correcting an output characteristic inherent in the image forming apparatus; and
    a limitation step, executed after said color conversion step and before said correction step, of reducing respective signal levels of the plural color component signals so that a sum total of the respective signal levels does not exceed a limitation value, so as to limit a sum total amount of the coloring materials when adhering the plural coloring materials respectively corresponding to the plural color component signals.

2. An image forming method according to claim 1, wherein said limitation step includes reducing, in a case where the respective signal levels of the two or more color component signals from among the plural color component signals are equal to or higher than a predetermined value, the respective signal levels of the two or more color component signals.

3. An image forming method according to claim 1, wherein said limitation step includes reducing the respective signal levels of the plural color component signals in correspondence with a combination of the respective signal levels of the plural color component signals.

4. An image forming method according to claim 1, wherein said limitation step changes the limitation value, in accordance with a kind of recording medium on which the image is to be formed.

5. An image forming method according to claim 1, wherein said limitation step includes changing the limitation value to a further smaller value, if a mode to reduce a use amount of the coloring materials less than ordinary is set.

6. An image forming apparatus which forms a color image by adhering plural coloring materials to a recording medium, comprising:
    an input unit arranged to input an image signal;
    a color conversion unit arranged to perform a color conversion process on the image signal input by said input unit, on the basis of profile data, to output plural color component signals;
    a gradation conversion unit arranged to perform a gradation conversion process on the plural color component signals output by said color conversion unit;
    a gamma correction unit arranged to correct an output characteristic inherent in said image forming apparatus; and
    a limitation unit arranged to perform a process, executed after the conversion process by said color conversion unit and before correction processing by said gamma correction unit, of reducing respective signal levels of the color component signals so that a sum total of the respective signal levels does not exceed a limitation value, so as to limit a sum total amount of the coloring materials when adhering the plural coloring materials respectively corresponding to the plural color component signals.

7. An image forming apparatus according to claim 6, wherein said limitation unit, in a case where the respective signal levels of the two or more color component signals from among the plural color component signals are equal to or higher than a predetermined value, reduces the respective signal levels of the two or more color component signals.

8. An image forming apparatus according to claim 6, wherein said limitation unit reduces the respective signal levels of the plural color component signals in correspondence with a combination of the respective signal levels of the plural color component signals.

* * * * *